United States Patent
Kuckelkorn et al.

(10) Patent No.: US 10,012,415 B2
(45) Date of Patent: Jul. 3, 2018

(54) ABSORBER TUBE

(71) Applicant: SCHOTT SOLAR AG, Mainz (DE)

(72) Inventors: Thomas Kuckelkorn, Jena (DE); Nikolaus Benz, Mainz (DE)

(73) Assignee: SCHOTT SOLAR AG, Mainz (DE)

( * ) Notice: Subject to any disclaimer, the term of this patent is extended or adjusted under 35 U.S.C. 154(b) by 234 days.

(21) Appl. No.: 14/975,538

(22) Filed: Dec. 18, 2015

(65) Prior Publication Data

US 2016/0102888 A1 Apr. 14, 2016

Related U.S. Application Data

(63) Continuation of application No. PCT/EP2014/062718, filed on Jun. 17, 2014.

(30) Foreign Application Priority Data

Jun. 18, 2013 (DE) .................. 10 2013 211 381

(51) Int. Cl.
*F24J 2/05* (2006.01)
*F24J 2/46* (2006.01)

(52) U.S. Cl.
CPC ............. *F24J 2/055* (2013.01); *F24J 2/4636* (2013.01); *Y02E 10/44* (2013.01)

(58) Field of Classification Search
CPC .... F24J 2/055; F24J 2/4636; F24J 2/04; F24J 2/07; Y02E 10/44; Y02E 10/41
See application file for complete search history.

(56) References Cited

U.S. PATENT DOCUMENTS 6,705,311 B1  3/2004  Schwartzman et al.
7,013,887 B2 *  3/2006  Kuckelkorn ............. F24J 2/055
                                                        126/652

(Continued)

FOREIGN PATENT DOCUMENTS

CN       201306861      9/2009
CN       102393094      3/2012

(Continued)

OTHER PUBLICATIONS

English translation of International Search Report dated Aug. 26, 2014 for corresponding PCT/EP2014/062718, 3 pages.

(Continued)

*Primary Examiner* — Alfred Basichas
(74) *Attorney, Agent, or Firm* — Ohlandt, Greeley, Ruggiero & Perle, L.L.P.

(57) ABSTRACT

An absorber tube is provided that includes a metal tube, a glass sleeve tube surrounding the metal tube, and a glass-metal transition element is disposed on at least one end. The metal tube and the transition element can be moved relative to one another in the longitudinal direction and connected to one another by an expansion compensating device. An inner end of the expansion compensating device is fastened to an attachment element, which is connected to the transition element. An outer end of the expansion compensating device is fastened to the metal tube. An annular space section of the annular space is constructed between the transition and attachment elements. The attachment element has an annular disc on which the expansion compensating device is fastened. The absorber tube has at least one shielding device that has a first annular disc-shaped section disposed on at least one end in the annular space.

20 Claims, 7 Drawing Sheets

(56) References Cited

U.S. PATENT DOCUMENTS

| | | | | |
|---|---|---|---|---|
| 7,552,726 | B2* | 6/2009 | Kuckelkorn | F24J 2/055 126/651 |
| 2004/0050381 | A1 | 3/2004 | Kuckelkorn et al. | |
| 2007/0034204 | A1 | 2/2007 | Kuckelkorn et al. | |
| 2012/0186576 | A1 | 7/2012 | Kuckelkorn et al. | |
| 2014/0345600 | A1 | 11/2014 | Mollenhoff et al. | |
| 2015/0168016 | A1 | 6/2015 | Benz et al. | |

FOREIGN PATENT DOCUMENTS

| | | |
|---|---|---|
| CN | 102519160 | 6/2012 |
| DE | 10231467 B4 | 2/2004 |
| DE | 102005022183 B3 | 8/2006 |
| DE | 60223711 T2 | 10/2008 |
| DE | 202013001309 U1 | 2/2013 |
| DE | 102011082767 A1 | 3/2013 |
| DE | 102012214412 B3 | 6/2013 |
| EP | 2581684 A2 | 9/2010 |
| EP | 2581684 A3 | 9/2010 |
| EP | 2597395 A1 | 5/2013 |
| JP | S58168846 A | 10/1983 |
| JP | 5753224 B2 | 5/2015 |
| WO | 2014026891 | 2/2014 |

OTHER PUBLICATIONS

English translation of Written Opinion of the International Searching Authority dated Aug. 26, 2014 for corresponding PCT/EP2014/062718, 8 pages.

English translation of International Preliminary Report on Patentability dated Dec. 22, 2015 for corresponding PCT/EP2014/062718, 9 pages.

* cited by examiner

ABSORBER TUBE

CROSS REFERENCE TO RELATED APPLICATIONS

This application is a continuation of International Application No. PCT/EP2014/062718 filed Jun. 17, 2014, which claims benefit under 35 U.S.C. § 119(a) of German Application No. DE102013211381.1 filed Jun. 18, 2013, the entire contents of both of which are incorporated herein by reference.

BACKGROUND OF THE INVENTION

1. Field of the Invention

The invention relates to an absorber tube.

2. Description of Related Art

DE 10 231 467 B4 describes such an absorber tube which is used in particular for parabolic trough collectors in solar power stations. The absorber tube has a central metal tube and a glass sleeve tube surrounding the central metal tube. The glass sleeve tube is provided on both ends with a glass-metal transition element, on each of which an expansion compensating device or an attachment element engages. The expansion compensating device is disposed at least partially in the annular space between the metal tube and the glass transition element.

The attachment element can extend in the annular space between the expansion compensating device and the metal tube, so that with a conical configuration of the attachment element the directly impinging radiation as well as the radiation from the metal tube is reflected back onto the metal tube.

The attachment element can also extend in the annular space between the expansion compensating device and the glass sleeve tube and in this case is connected to the glass-metal transition element. The attachment element has a fastening element in the form of an annular disc by which the attachment element is fastened on the expansion compensating device which may comprise a bellows. An annular disc is a flat round object.

DE 60 223 711 T2 discloses an absorber tube in which the glass-metal transition element and the expansion compensating device are disposed in the configuration of a bellows one behind the other in the axial direction. On the outer face are provided a first shield element, which shields the bellows, and a second shield element, which shields the glass-metal transition element against incident radiation. Moreover an internal radiation shield is disposed in the annular space between the glass sleeve tube and the metal tube in the region of the glass-metal transition element. The internal radiation shield is attached in the bellows by retaining arms.

A disadvantage of this arrangement with bellows and with a glass-metal transition element is the relatively large overall length, which leads to a reduction of the free aperture and thus of the efficiency.

The glass-metal transition element is protected at the outset by one of the two outer shield elements against direct irradiation from the exterior. The internal radiation shield having an L-shaped cross-section only has support arms in the region of the glass-metal transition element, so that direct incident and reflected radiation from the metal tube can impinge on the glass-metal transition element in the region between the support arms. Only a part of this radiation is caught by the internal radiation shield.

This design has the further disadvantage that it absorbs radiation itself and as a result is heated. The internal radiation shield is only insufficiently thermally coupled to the bellows by means of the support arms, so that the proportion of the radiation which is absorbed by the annular component must for the most part be emitted again by radiation. A considerable proportion of the heat radiation strikes the glass-metal transition element. As a result the glass-metal transition element undergoes a secondary heat input by radiation from the heated radiation shield.

Both DE 10 231 467 B4 and also DE 60 223 711 T2 disclose an externally located protection of the glass-metal transition and the expansion compensating device. Nowadays this externally located protection is generally fitted after the installation of the receiver in the power station. For this purpose shielding plates are fitted after the receivers are welded together in the field.

A disadvantage in this case is that the glass-metal transition is unprotected during transport and installation and as a result can be easily damaged. During the fitting process scratches can occur in the sleeve tube, wherein scratches in the vicinity of the glass-metal transition element are particularly critical and can lead to weakening of the absorber tube and to subsequent breakage of glass in operation.

SUMMARY

The object of the invention, starting from the prior art according to DE 10 231 467 B4, is to further increase the service life of the absorber tube.

It is provided that the absorber tube has a central metal tube and a glass sleeve tube surrounding the metal tube, wherein a glass-metal transition element is disposed on at least one end of the glass sleeve tube. This glass-metal transition element is connected by means of at least one expansion compensating device to the metal tube. Moreover the glass-metal transition element and the metal tube are disposed so as to be movable relative to one another in the longitudinal direction via the expansion compensating device. In this case the expansion compensating device is disposed at least partially in an annular space between the metal tube and the glass-metal transition element. An inner end of the expansion compensating device is fastened to an attachment element which is connected to the glass-metal transition element and an outer end of the expansion compensating device is fastened to the metal tube. An annular space section of the annular space is constructed between the glass-metal transition element and the attachment element, and the attachment element and the expansion compensating device together have a circular ring-shaped end face in axial plan view.

The attachment element of the absorber tube has an annular disc on which the expansion compensating device is fastened.

It is provided that at least one shielding device which has a first annular disc-shaped section is disposed on at least one end of the absorber tube in the annular space, wherein in the axial direction the annular disc-shaped section is disposed with a spacing before the end face.

The end face and the connection point of the attachment element and the expansion compensating device are explained in greater detail in connection with FIG. 2.

The first annular disc-shaped section has the advantage that it protects not only the connection region of the expansion compensating device and of the attachment element but also the glass-metal transition element at least partially against solar radiation and/or against radiation reflected from the metal tube and or IR radiation emitted by the metal tube.

It has been shown that the glass-metal transition element and the expansion compensating device constitute critical components with respect to the service life of the absorber tube.

Although the radiation reflected by the metal tube or emitted radiation is to some extent kept away from the expansion compensating device and the glass-metal transition element at least partially by the annular disc of the attachment element, damage can still occur, in particular in the region where the expansion compensating device is connected to the annular disc. Thus in some circumstances leaks can occur at the points of contact, so that then the necessary vacuum is lost in the annular space or the gas, in particular the noble gas filling, is contaminated in the annular space by the intrusion of air. This damage is avoided by means of the shielding device. It has been shown that the service life of the absorber tube can be effectively increased by the first annular disc-shaped section of the shielding device in the annular space of the absorber tube and of the annular disc on the attachment element.

By means of the size of the surface of the first annular disc-shaped section the quantity of radiation to be shielded against can be adjusted in a targeted manner. The first annular disc-shaped section preferably covers at least 50% of the end face.

The radiation energy which impinges on the first annular disc-shaped section leads to heating of the first annular disc-shaped section and is distributed by heat conduction in the surface of the shielding device, so that the temperature level is lowered. The majority of the radiation is reflected directly outwards, or to the metal tube, by the preferably smooth surface, whereas in the prior art the majority of the radiation is absorbed in the bellows loops. The absorbed part of the radiation is distributed by heat conduction in the entire shielding device, so that a uniform temperature level is reached over the entire shielding device. The shielding device is preferably connected to a metal component of the absorber tube—with the exception of the metal tube—so that the heat can also be dissipated. This is explained in detail.

The annular disc of the attachment element has the advantage, that a significant increase in stability of the attachment element and thus of the entire arrangement of expansion compensating device and attachment element is achieved. Furthermore the annular disc enables an additional protection of the expansion compensating device against solar radiation or/and against radiation emitted by the metal tube. In particular this annular disc can be used as mounting surface for additional functional elements such as for example a protective gas container or an indicator getter spring.

Since the material of the expansion compensating device is generally more heavily loaded in operation of the absorber tube because of the necessary mobility than the attachment element which can also be manufactured from a more resistant material with respect to the temperature load and the radiation load, it is advantageous if the annular disc of the attachment element is as large as possible. As a result there is a saving of material of the expansion compensating device, which additionally improves the service life the entire arrangement consisting of the attachment element and the expansion compensating device.

It is advantageous if the annular disc of the attachment element takes up at least 50%, preferably at least 75%, particularly preferably at least 90% and in particular up to 100% of the circular end face.

The larger the annular disc is, the smaller the radius $R3$ of the inner edge of the annular disc is, so that the connection region of the expansion compensating device and the annular disc moves nearer to the metal tube. Thus the expansion compensating device is exposed to less solar radiation and/or less radiation reflected by the metal tube. This has the further advantage that the first annular disc-shaped section of the shielding device does not have to cover the connection region or does not have to cover it completely.

The first annular disc-shaped section of the shielding device preferably covers 50% to 80%, particularly preferably 80% to 95% of the circular ring-shaped end face. The proportion of the radiation to be shielded against and the radiation impinging on the attachment element and thus the temperature distribution on the relevant end of the absorber tube can be adjusted in a targeted manner by means of the size of the surface of the first annular section in relation to the surface of the annular disc of the attachment element can.

A further advantage of an annular disc of the attachment element which is as large as possible is that the heat energy can be better distributed and dissipated via the attachment element.

The annular disc of the connecting element preferably has an inner edge with an inner radius $R3$ on which the expansion compensating device is fastened.

In a preferred embodiment the first annular disc-shaped section of the shielding device has an inner radius $R1$, wherein the inner radius $R1$ is greater than/equal to the inner radius $R3$.

This configuration in particular offers an advantage during the fitting process. The greater the radius $R1$ is, the easier it is during the joining together of the shielding device, attachment element and expansion compensating device to avoid the shielding device touching the metal tube and causing disruptive scratches in the surface thereof.

The larger the annular disc is, the smaller the radius $R3$ of the inner edge of the annular disc is, so that the connection region of the expansion compensating device and the annular disc moves nearer to the metal tube and thus additionally shields the sensitive expansion compensating device against solar radiation and/or against radiation reflected by the metal tube.

In a further preferred embodiment the expansion compensating device has an inner radius $R2$, wherein $R2$ is greater than/equal to $R3$.

This embodiment offers the advantage that in the event of radial relative movements between the metal tube and the glass tube, such as occur in particular with vibrations during the transport, contacts between the more sensitive expansion compensating device and the metal tube can be largely avoided.

In a further preferred embodiment the annular disc of the attachment element has a first bead on which the expansion compensating device is disposed. This bead is preferably disposed circumferentially around the complete circumference of the annular disc and is curved axially in the direction of the expansion compensating element. Consequently the opening of the bead is located on the side facing away from the expansion compensating element. In this case the base of the bead in section can be circular or also oval, or elongate.

The advantage of this embodiment is a significant increase in stability and rigidity of the annular disc, so that the long-term stability of the absorber tube can be increased. Moreover, the weld point between the annular disc and the expansion compensating element is more easily accessible during the manufacturing process.

The first annular disc-shaped section can disposed perpendicular to the central axis M. However, it is particularly preferred that the first annular disc-shaped section is inclined by an angle $\alpha \geq 0$ with respect to a perpendicular S on the central axis M of the absorber tube. The first annular disc-shaped section is preferably inclined in such a way that a radially outer edge constitutes the part of the shielding device which protrudes furthest into the annular space. The axially outer edge of the shielding device protrudes further into the annular space than an inner edge of the first annular disc-shaped section of the shielding device.

This embodiment has the advantage that a large part of the obliquely incident beams does not impinge on the shielding device, where it partially leads to the useless heating thereof, but impinges directly on the metal tube is converted there into useful heat. The inclination of the first annular disc-shaped section increases the effective surface of the absorber tube by comparison with an end face section which is not inclined.

The angle $\alpha$ is preferably in the range from 0°-30°. This range is preferred because in the middle of the year at conventional erection sites for solar thermal parabolic trough power stations the solar radiation impinges particularly frequently at an angle of approximately 20°.

With an angle >30° the radially outer edge of the shielding device would be displaced axially towards the centre of the tube, thus overlapping a part of the metal tube, so that the effective length of the metal tube would be reduced in particular with almost perpendicular incident radiation.

The shielding device extends at least partially in the annular space section between the glass-metal transition element and the attachment element. As a result the heat of the first annular disc-shaped section is better distributed and led into the cooler region of the annular space section.

It is therefore preferable that the first annular disc-shaped section merges on its radially outer edge into a first tubular section which extends into the annular space section. The tubular section is preferably of cylindrical or conical construction.

The conical construction has the advantage that a good contact with the tubular section of the attachment element can be produced for the purpose of heat conduction without highly precise manufacturing tolerances being necessary for the attachment element and the tubular section of the shielding device.

The shielding device preferably has a second annular disc-shaped section. This second annular section adjoins the first tubular section to and likewise contributes to better distribution of heat.

The shielding device preferably has a second tubular section which adjoins the second annular disc-shaped section.

The second annular disc-shaped section is preferably located on the glass-metal transition element or on an annular disc-shaped section of the connecting element. This has the advantage that the shielding device can be fixed by means of the second annular disc-shaped section. The second tubular section of the shielding device can likewise bear against the tubular section of the attachment element. Also by means of this second annular disc-shaped section and/or the second tubular section heat can be led off to the glass-metal transition element or to the attachment element and thus dissipated to the surroundings of the absorber tube.

The shielding device preferably has a third annular disc-shaped section.

The third annular disc-shaped section preferably adjoins the second tubular section and is preferably located on the glass-metal transition element. This offers the advantage that the shielding device can also be fixed by means of the third annular disc-shaped section. Also by means of the third annular disc-shaped section heat can be led off onto the glass-metal transition element. The third annular disc-shaped section extends radially outwards in the annular space formed between the expansion compensating device and the glass-metal transition element.

The glass-metal transition element preferably has an annular step on which the third annular disc-shaped section of the shielding device is supported.

The second annular disc-shaped section extends radially outwards in the annular space formed between the expansion compensating device and the glass-metal transition element and according to one embodiment can be supported on the glass-metal transition element. In this way an annular chamber which can serve to accommodate getter material can be separated between the second annular disc-shaped section and an outer annular disc section of the attachment element.

Another embodiment provides that the second or the third annular disc-shaped section of the shielding device bears against the annular disc section of the attachment element. This embodiment has the advantage that the heat of the shielding device can be led off outwards by means of the annular disc section of the attachment element. Depending upon the choice of embodiment the second tubular section of the shielding device is longer or shorter.

The annular step of the glass-metal transition element also leads to an increased diameter of the glass-metal transition element in the direction of the tube end. The annular chamber between the second annular disc-shaped section and the annular disc section of the attachment element is enlarged thereby so that more space is available to accommodate getter material. Moreover the annular step prevents an axial displacement of the shielding element away from the end face of the expansion compensating device.

A getter is preferably disposed in the annular space section between the glass-metal transition element and the attachment element. A getter consists is made of a material which is capable of binding residual gases chemically or physically in a largely evacuated space. Thus the vacuum necessary for heat insulation of the receiver is maintained in the annular space between the metal tube and the glass sleeve tube over a long operating period.

The application of the getter in the annular space has the advantage that an additional holding arrangement for accommodation of the getter is omitted. The getter is held by the annular section of the attachment element on the one hand and by the annular disc section of the shielding element.

The first tubular section of the shielding device is preferably disposed in the spacing from the attachment element. In particular the first tubular section is disposed in the spacing from the tubular section of the attachment element.

As a result the annular space section between the glass-metal transition element and the shielding device is reduced. The surface of the first annular disc-shaped section can be increased thereby, so that less radiation from below can reach the glass-metal transition element.

The first tubular section preferably contacts the attachment element, preferably the tubular section of the attachment element.

This contact by positive engagement has the advantage that the heat of the shielding device can be led off better.

Preferably the connecting element has at least one fourth bead and the first tubular section of the shielding device has a third bead which are configured in such a way that they can engage in one another. In this case the beads are preferably disposed in sections in the circumferential direction of the attachment element and of the first tubular section. The beads preferably engage in one another when the attachment element and the first tubular section are pushed into one another. Preferably in each case three fourth beads are disposed on the attachment element and three third beads are disposed on the tubular section.

The construction of beads has the advantage of increasing the rigidity of the respective elements. Furthermore these beads likewise prevent a displacement in the axial direction and a rotation of the shielding device about the central axis of the absorber tube and are necessary so that the shielding device is fixed on the attachment element.

The shielding device preferably has openings. These openings, which may be holes or slots, are preferably disposed in the second annular disc-shaped section and/or in the first tubular section of the shielding device. In order that gases, in particular hydrogen, diffused into the annular space can be bound by the getter, it is advantageous that the gas exchange can take place through these openings.

The shielding device is preferably an annular element. The element is preferably formed as a closed ring.

An outer protective cap which covers at least the glass-metal transition element is preferably provided on the outer face of the glass sleeve tube.

The glass-metal transition element is already protected by the firmly mounted outer protective cap against mechanically damage during the last stages of production of the absorber tube, during transport as well as in the installation process in the power station. Furthermore the outer protective cap protects the glass-metal transition element against radiation coming from outside from the primary mirror. Moreover, heat from the glass-metal transition element is led off, directed outwards and dissipated to the ambient air by convection.

A flange is preferably provided on the outer protective cap. This flange is preferably attached to the free end of the outer protective cap and directed radially away from the absorber tube.

This flange offers the advantage of increasing the rigidity of the outer protective cap and thus leads to an enhanced resistance of the protective cap to external mechanical effects.

A holder which is configured in such a way that it is suitable for the arrangement of at least one protective gas container or/and an indicator getter spring is preferably fastened to the annular disc of the expansion compensating device.

The attachment of the holder to the connecting element has the advantage that at least one protective gas container can be disposed in the inner annular space on a stable component of the absorber tube. If need be a protective gas can be introduced into the annular space. This is particularly advantageous if after a long period of operation hydrogen has collected in the inner annular space and the absorption capacity of the getter is already depleted. Due to the introduction of the protective gas, in the inner annular space a gas mixture is produced of which the heat insulating effect is no longer as good as that of the original vacuum, but is substantially better than that of hydrogen. Thus heat losses can be significantly reduced over a further operating period.

The first annular disc-shaped section has a section or an opening for the passage of the holder and/or the holder and the protective gas container on.

This opening has the advantage that both the holder or the protective gas container or the indicator getter spring or also the holder and the protective gas container or the indicator getter spring are disposed at least partially directly in the inner annular space. Due to this arrangement the protective gas container or/and the indicator getter spring can be accommodated in a space-saving manner in the absorber tube. Moreover for the gas inlet into the inner annular space through the protective gas container no separate conduit device has to be provided.

BRIEF DESCRIPTION OF THE DRAWINGS

Exemplary embodiments are explained in greater detail below with reference to the drawings.

DETAILED DESCRIPTION

Figure 1:
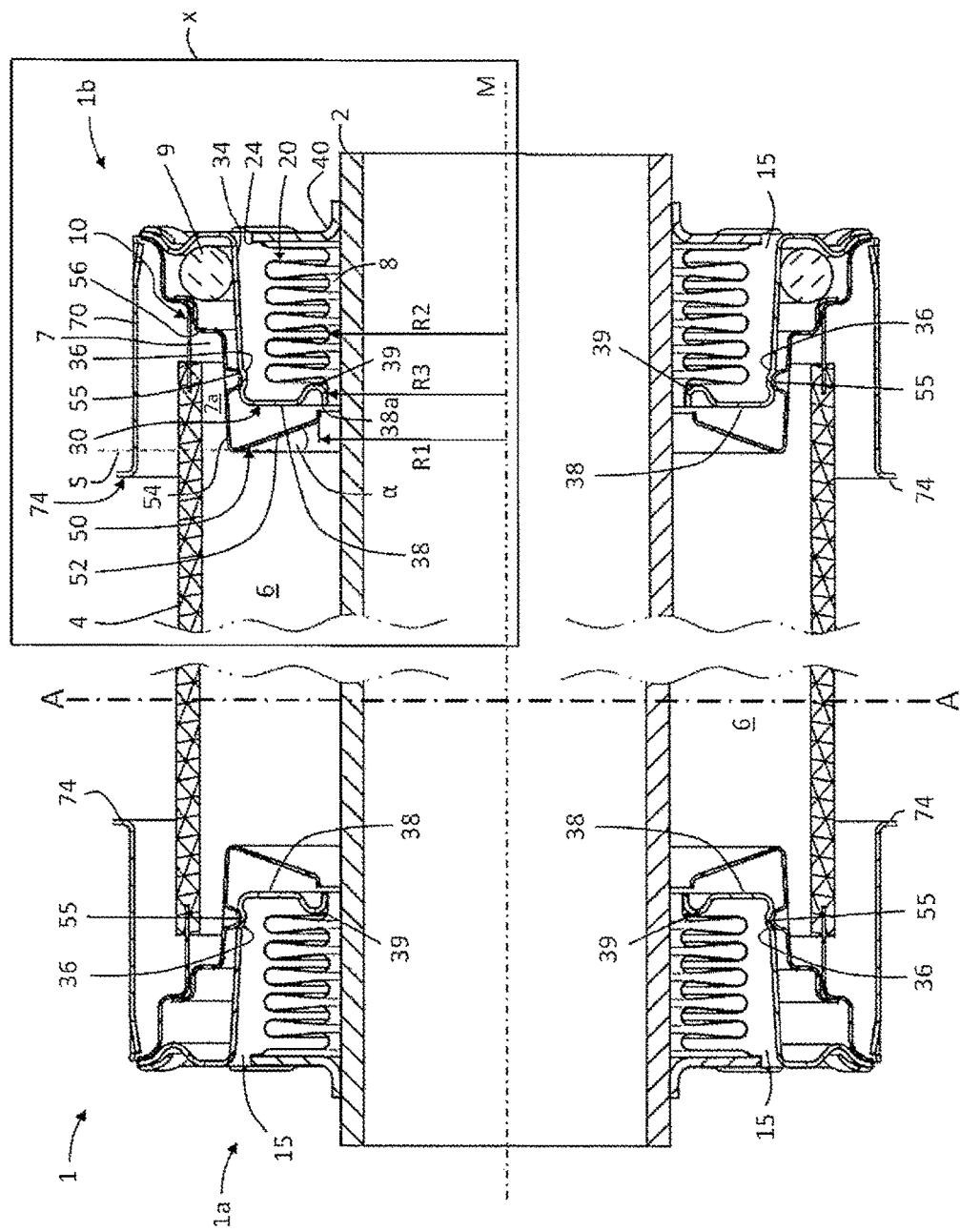
FIG. 1 shows a longitudinal section through an absorber tube.

In FIG. 1 an absorber tube 1 with a central axis M is shown. The absorber tube 1 has a metal tube 2, through which a heat exchange fluid flows, and a glass sleeve tube 4. In this case the glass sleeve tube 4 is disposed coaxially with the metal tube 4 and is connected by means of a glass-metal transition element 10, an attachment element 30 and an expansion compensating device 20 in the form of a bellows and a fastening element 40 to the metal tube 2. In this case the expansion compensating device 20 is fastened with its outer end 24 on the fastening element 40. In this arrangement the expansion compensating device 20 is at least partially framed by the attachment element 30, wherein the expansion compensating device 20 with the attachment element 30 delimits an outer annular space 15 which is open to the exterior (see FIG. 3). Between the glass sleeve tube 4 and the metal tube 2 an inner annular space 6 is formed which is evacuated or is filled with a protective or noble gas.

At the ends 1a and 1b of the absorber tube 1 this annular space 6 merges into the two annular space sections 7 and 8. The annular space section 7 is formed substantially between the glass-metal transition element 10 and the attachment element 30 and is divided into the sub-sections 7a, b and c. The sub-section 7a is delimited by the glass sleeve tube 4 and the glass-metal transition element 10 on the one hand and a shielding device 50 on the other hand. The sub-sections 7b and 7c are located between the attachment element 30 and the shielding device 50, wherein a getter 9 is disposed in the annular space section 7b. The annular space section 8 is located between the metal tube 2 and the expansion compensating device 20.

The metal tube 2 usually has a coating which, however, is not shown in FIG. 1. The coating is designed to optimally absorb the solar radiation incident through the glass sleeve tube 4. FIG. 1 shows an expansion compensating device 20 at both ends 1a and 1b of the absorber tube 1. It is also possible to provide the absorber tube 1 only at one end 1a or 1b with such an expansion compensating device 20.

FIG. 1 shows a first embodiment of the shielding device 50 and an attachment element 30 which is described in detail in connection with FIG. 3.

Figure 2:
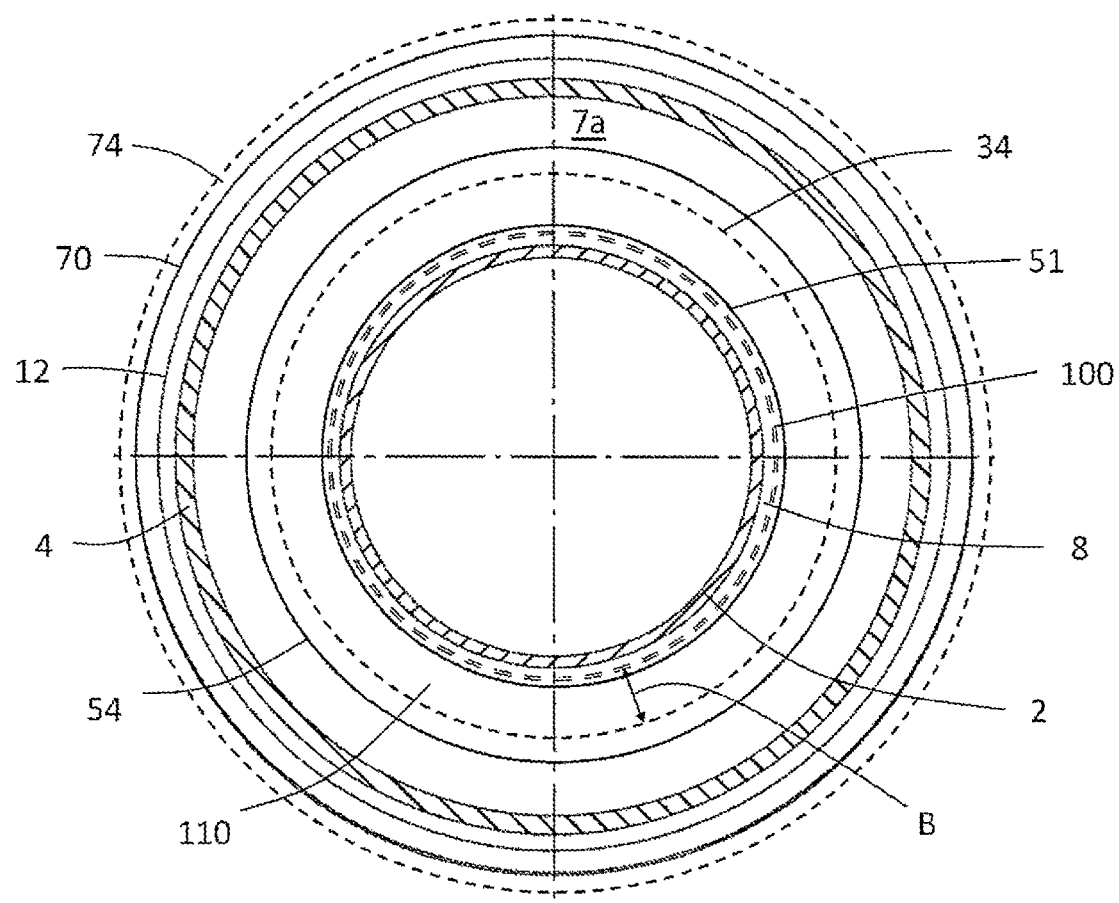
FIG. 2 shows a section through the absorber tube along the line A-A in FIG. 1.

FIG. 2 shows a section through the absorber tube along the line A-A in FIG. 1. The axial plan view, in the direction of the tube end 1b, onto the connection element 30 and the expansion compensating device 20 define the end face 110 which has a width B. The attachment element 30 according to FIG. 1 and the expansion compensating device 20 are connected to one another at the connection point 100.

Figure 3:
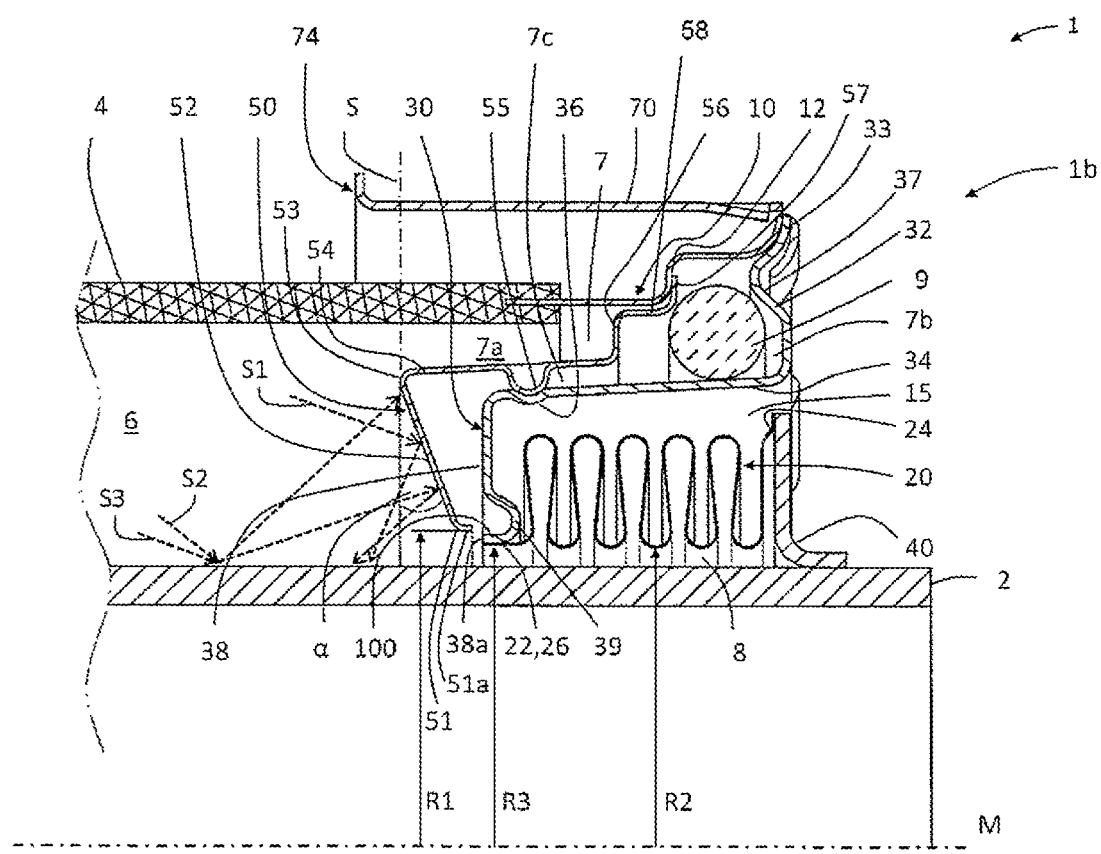
FIG. 3 shows an enlarged representation of the detail X of FIG. 1.

FIG. 3 shows an enlarged representation of the detail X from FIG. 1. The bellows of the expansion compensating device 20 is fastened at the outer end 24 on the fastening element 40, which in turn is fastened, in particular welded, on the metal tube 2. At the inner end 22 the bellows has a connecting section 26 to which the attachment element 30 is fastened with its fastening section 39.

The attachment element 30 has an annular disc 38 which opens into the fastening section 39 and is disposed perpendicular to the metal tube 2. In this case the fastening section 39 is curved in radially in the direction of the expansion compensating device 20 concave and the connection between the fastening section 39 and the expansion compensating device 20 takes place parallel to the metal tube 2. The fastening section 39 preferably constitutes a first bead. The expansion compensating device 20 has an inner radius R2 and the inner edge 38a of the attachment element 30 has an inner radius R3 to the central axis M of the metal tube 2. Thus the annular space section 20 is formed between the expansion compensating device 8 and the metal tube 2.

The attachment element 30 has a conically constructed tubular section 34 which delimits the annular space sections 7b and 7c and on the end 1b (in FIG. 1 also the end 1a) merges into an annular disc section 32. The annular disc section 32 has an inwardly directed second bead 37 and a fastening section 33 which extends radially outwards. The glass-metal transition element 10 as well as the outer protective cap 70 is disposed on the fastening section 33. The outer protective cap 70 is preferably welded together with the glass-metal transition element 10 and the annular disc section 32 during the production of the absorber tube 1 or is firmly connected thereto by means of some other positively engaged, non-positively engaged or cohesive bonding connection. The outer protective cap 70 extends over the entire glass-metal transition element. In this respect during subsequent transport the outer protective cap 70 serves as additional protection of the glass-metal transition region, namely the connection point between the glass sleeve tube 4 and the glass-metal transition element 10. For additional reinforcement a radially outwardly directed flange 74 is attached to the free end of the outer protective cap 70.

A shielding device 50 is arranged for additional protection of the expansion compensating device 20. The glass-metal transition element 10 has an annular step 12 on which the shielding device 50 is supported. The shielding device 50 has a first annular disc-shaped section 52, of which the inner edge 51 has an inner radius R1 to the central axis M of the metal tube 2 exhibits and which is disposed with a spacing before the end face 110.

The inner edge 51 has an angled section 51a which faces in the direction of the annular disc 38 of the attachment element 30 and which at least partially bridges the distance to the attachment element 30, so that the penetration of beams reflected on the metal tube 2 is prevented. This angled section 51a ends in the radial direction before the connection region 100, which thus is not covered by the shielding device 501. The first annular disc-shaped section 52 is disposed so far in front of the end face 110 in the axial direction that the connection region 100 is nevertheless for the most part protected against radiation.

In FIGS. 1 and 3 it can be clearly seen that the inner radius R1 of the annular disc-shaped portion 52 of the shielding device 50 is greater than/equal to the inner radius R2 of the expansion compensating device 20 and greater than/equal to the inner radius R3 of the attachment element 30. In this case the annular disc-shaped section 52 is inclined at an angle α ~10° relative to the perpendicular S on the central axis M. The inclination of the section 52 is selected in such a way that the radially outer edge 53 of the shielding device 50 protrudes furthest into the annular space 6. The inclined first annular section 52 reflects obliquely incident radiation S1 back onto the metal tube 2. Radiation S2 and S3 which impinges obliquely on the metal tube 2 is reflected onto the first annular disc-shaped section 52 which keeps the radiation away from the bellows 20 as well as from the glass-metal transition element 10. Thus the first annular disc-shaped section 52 forms a conical section of the shielding device 50. The shielding device 50 does not contact the bellows.

Moreover the shielding device 50 has a first tubular section 54. By means of a third bead 55 in this tubular section 54 the shielding device 50 engages in a fourth bead 36 of the attachment element 30, thereby achieving a reinforcement of the shielding device 50 and of the attachment element 30 inside the absorber tube 1. An inner annular space section 7c in which the beads 36 and 55 are located is formed by a spacing between the tubular section 54 of the shielding device 50 and of the tubular section 34 of the attachment element. The tubular sections 34 and 54 can also lie at least partially above one another with or without beads 36, 55.

The tubular section 34 of the attachment element 30 is, like the first tubular section 54, of conical construction. In the embodiment illustrated here the first tubular section 54, up to the connection point of the third bead 55 and fourth bead 36, does not bear on the conical section 34. The heat of the first tubular section 54 is given off by means of the attachment element 30 to the ambient air, wherein only a minor heat contact takes place via the surfaces of the third and fourth beads 55 and 36. A greater proportion of heat flows off via the glass-metal transition element 10. The section 54 extends only partially into the annular space section 7, wherein in approximately the middle of the longitudinal extent of the annular space section 7 the second annular disc-shaped section 56 adjoins a second tubular section 58. A third annular disc-shaped section 57, which rests on an annular shoulder 12 of the glass-metal transition element 10, adjoins the second tubular section 58. The annular space section 7 is divided by means of the sections 54, 56 and 58 into the annular space section 7a, 7c and the annular chamber 7b.

The glass-metal transition element 10 is fastened at one end on the glass sleeve tube 4 and extends in the axial direction outwards, where at the other end the glass-metal transition element 10 is connected to the connecting element 30. The annular shoulder 12 leads to an increased diameter, so that the annular chamber 7 is widened, so that sufficient space is created to accommodate a getter 9 (see also FIG. 1).

Thus a getter 9 is disposed between the second annular section 56 and the annular disc section 32 in the annular chamber 7b. As shown in FIG. 1, the getter 9 preferably has a round cross-section and is retained against displacement in the axial direction by means of the inwardly directed second bead 37 and a third annular section 57 of the shielding device 50.

Without the shielding device 50 the connection region 100 would be exposed both to the incident radiation and also to the radiation reflected from the metal tube 2 and would thereby undergo a high thermal load. Due to leaks caused thereby in the connection region 100 the negative pressure in the annular space 6 would be impaired. The service life of the absorber tube 1 is significantly increased by the shielding device 50 and in particular by the first annular disc-shaped section 52.

Figure 4:
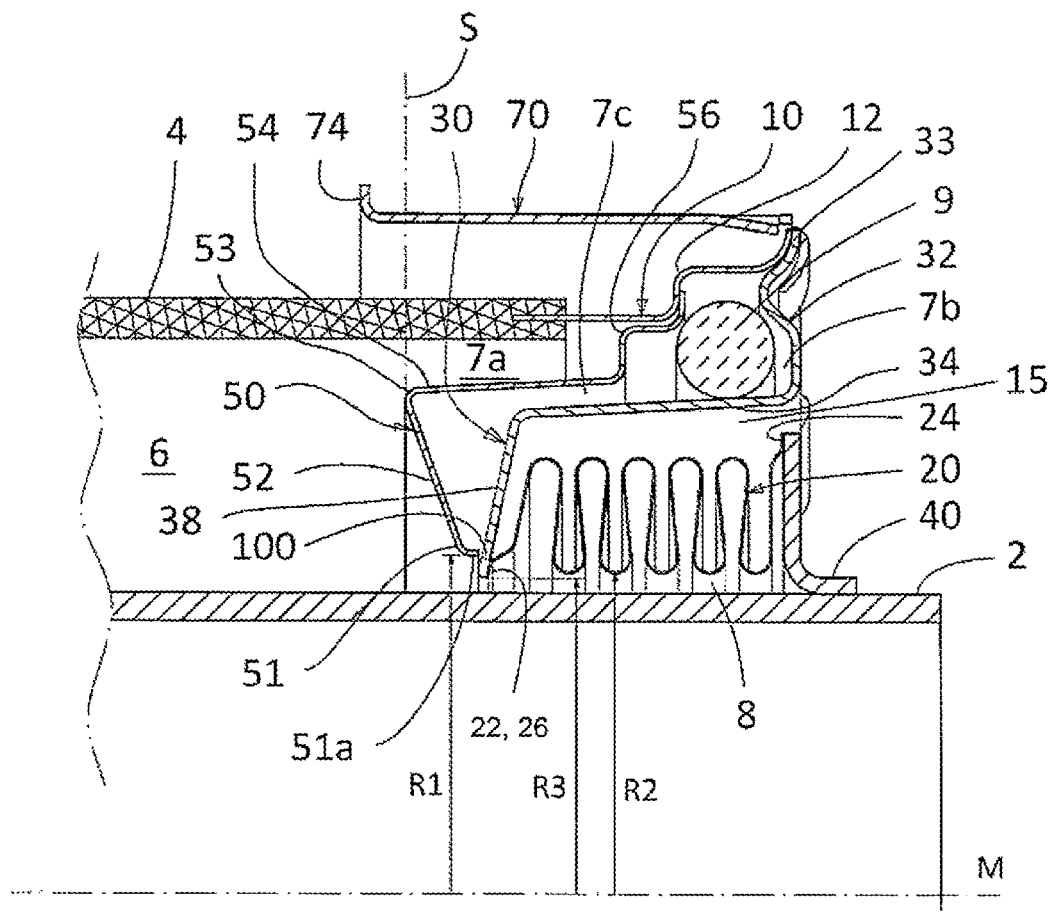
FIG. 4 shows an enlarged representation of a detail of a further embodiment of the detail X of FIG. 1.

A further embodiment of the absorber tube 1 is illustrated in FIG. 4. In contrast to FIGS. 1 and 3 neither the attachment element 30 nor the shielding device 50 has a third bead 55 or a fourth bead 36. The first tubular section 54 is disposed spaced apart from the tubular section 34, so that a larger inner annular space section 7*c* is formed. Moreover, in contrast to FIG. 1, the connection region 100 is not disposed parallel to the metal tube 2 but merely as an extension of the annular disc 38. The connecting section 26 of the expansion compensating device 20 is located behind the annular disc 38 and thus in a region which is protected against radiation. In contrast to the first embodiment, the annular disc 38 is not disposed perpendicular to the central axis M but inclined with respect thereto, wherein the inner end 22 projects furthest into the annular space 6. Thus the entire annular disc 38 is of conical construction.

The attachment element 30 also has an annular disc 38 without a fastening section curved in radially in the direction of the expansion compensating device 20, consequently without a first bead 39. Also in this embodiment the inner radius R2 of the expansion compensating device 20 to the central axis M of the metal tube 2 is less than the inner radius R1 of the first annular disc-shaped section 52 from the central axis M of the metal tube 2. Also in this embodiment the first annular disc-shaped section has an angled inner edge 51*a*. However, in contrast to FIG. 1 and FIG. 3, the inner radius R3 here of the inner radius of the annular disc 38 of the attachment element 30 is less than R2.

Figure 5:
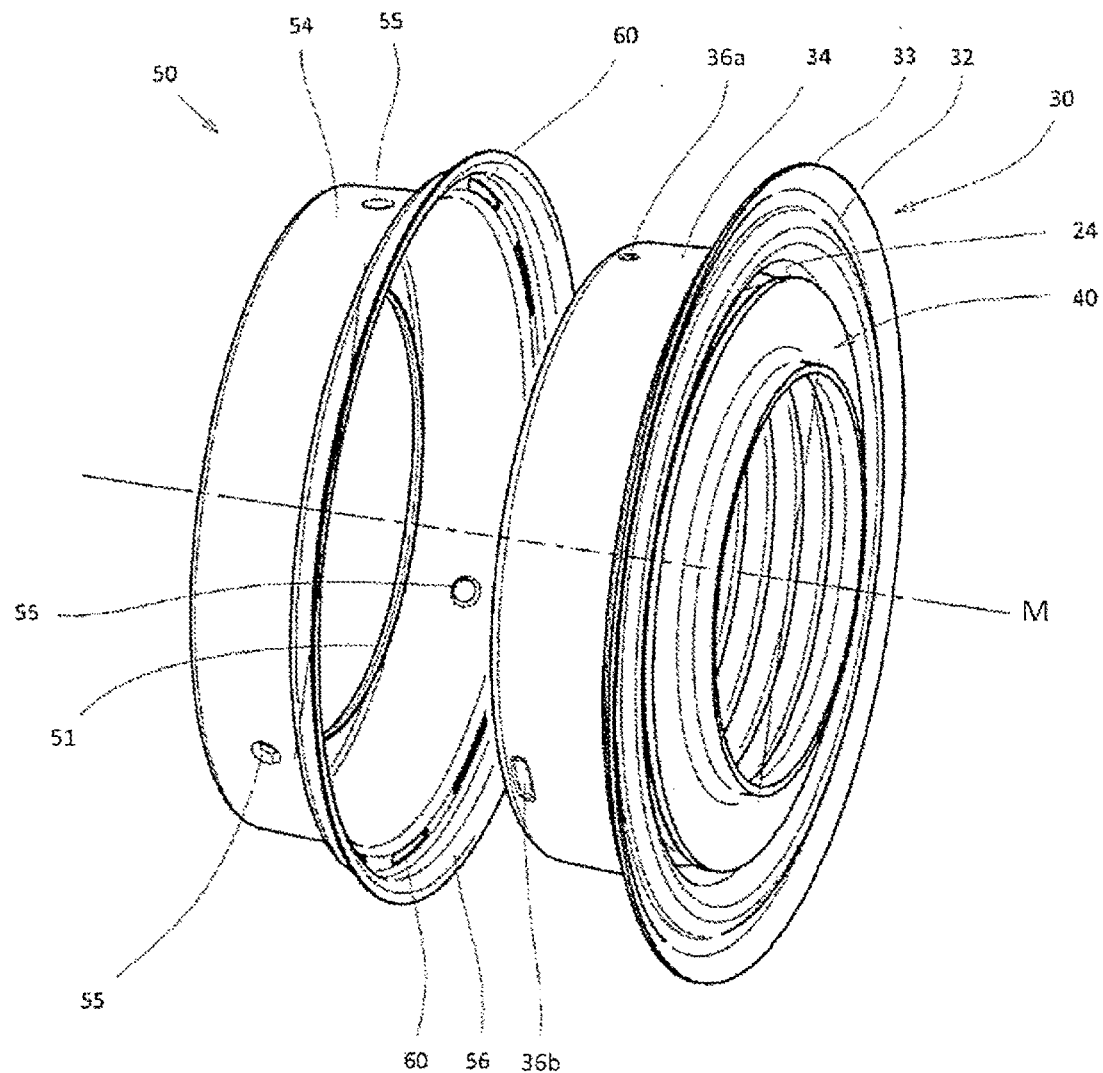
FIG. 5 shows a perspective exploded representation of individual parts of FIG. 1.

In FIG. 5 a perspective exploded view of individual parts of FIG. 1 is illustrated, in which the attachment element 30 and the shielding device 50 are shown separately from one another. This shows clearly the arrangement of the three third beads 55 in the shielding device 50, which are each disposed circumferentially at an angle of 120° relative to one another around the central axis M of the shielding device 50 or of the attachment element 30. This is shown even more clearly in FIG. 6. In this case the central axis of the shielding device 50 and of the attachment element 30, when brought together with the metal tube 2, coincides with the central axis M thereof, so that only one reference sign is used here.

However, the attachment element 30 has two different fourth beads 36*a* and 36*b*. The fourth bead 36*b* is, like the fourth bead 36*a*, disposed in the tubular section 34 of the attachment element 30 in which one of the third beads 55 of the shielding device 50 engages. However, the fourth bead 36*b* has a base surface which is oval or elongate in the circumferential direction of the attachment element, whereas the fourth bead 36*a* has a circular base. The tubular section 34 preferably contains a fourth bead 36*a* with a circular cross-section and two fourth beads 36*b* with oval or elongate cross-section, which are likewise disposed at an angle of 120° around the central axis M. In FIG. 3, however, because of the perspective representation only one fourth bead 36*a* and 36*b* is illustrated in each case. The fourth bead 36*a* prevents both displacements of the shielding device 50 in the axial direction and also rotations about the central axis M of the absorber tube 1 which in FIG. 3 is identical to the central axis M. The fourth beads 36*b* likewise prevent a displacement in the axial direction and are necessary so that the shielding device 50 is fixed on the attachment element 30. Due to the oval base surface this additionally allows higher tolerances in the distribution of the third and fourth beads 55 and 36 about the central axis M of the metal tube 2, so that the angular spacing of the fourth beads 36*a* and 36*b* as well as the third beads 55 no longer have to be exact 120°. As a result the manufacture of the shielding device 50 is simpler and more economical than in a comparable design in which the fourth beads 36*a* and 36*b* in the attachment element 30 all have a circular base surface.

In addition openings 60 in the form of holes are introduced in the section 56, so that residual gases in the evacuated annular space 6 can reach the getter 9. These holes can also be disposed in the form of radial slots.

Figure 6:
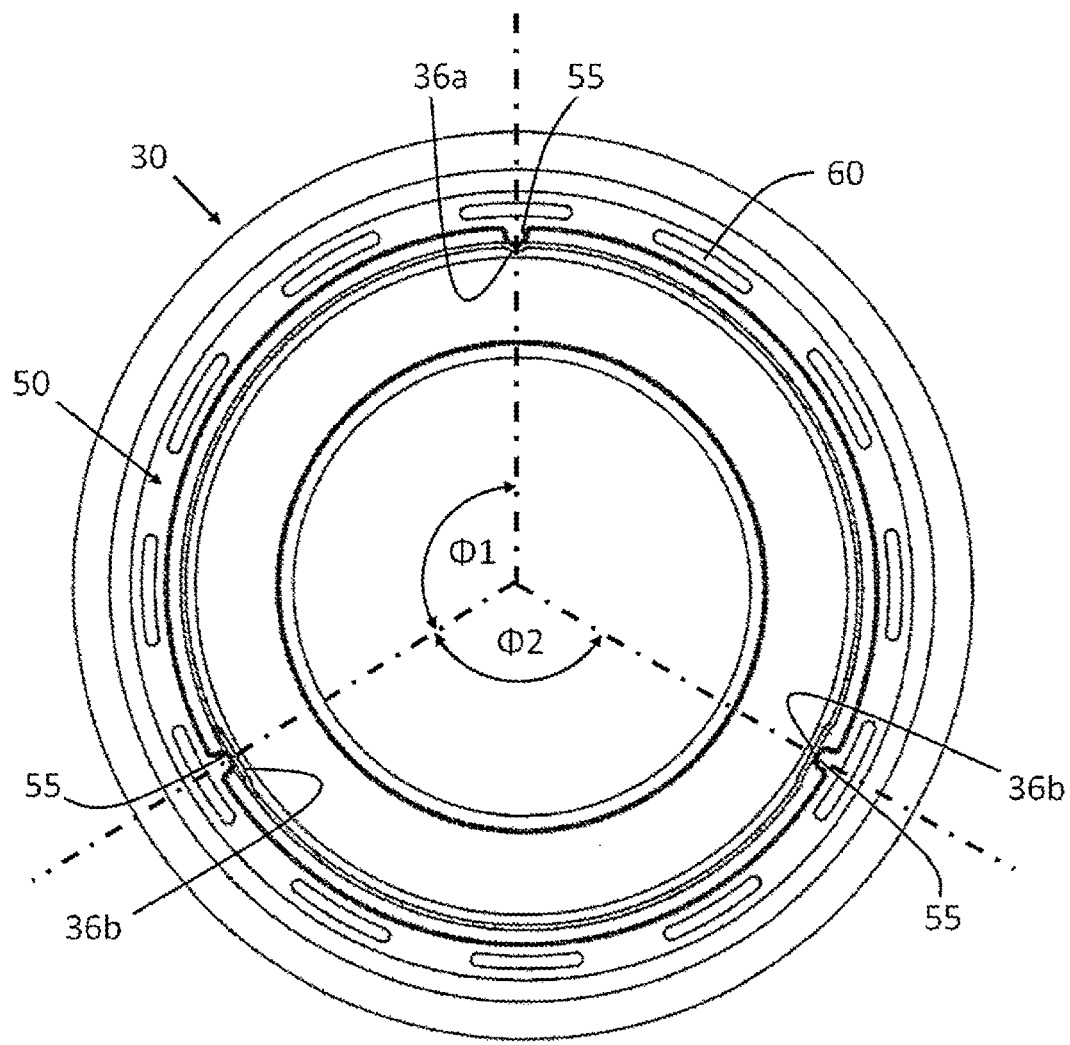
FIG. 6 shows a sectional representation of FIG. 1, in which only the attachment element and the shielding element are shown.

FIG. 6 shows a sectional representation of FIG. 1 perpendicular to the central axis M of the metal tube 2, wherein for the sake of clarity only the attachment element 30 and the shielding element 50 are shown. In this drawing the angular distribution $\phi_1$ and $\phi_2$ of the fourth beads 36*a* and 36*b* can be clearly seen. Angle $\phi_1$ identifies the angle about the central axis M of the fourth bead 36*a* and the fourth bead 36*b*. Angle $\phi_2$ identifies the angle about the central axis M between two fourth beads 36*b*. Angle $\phi_1$ and angle $\phi_2$ are each preferably close to 120°. Since the third beads 55 are at least partially congruent with the fourth beads 36*a* and 36*b*, the angle between the beads is likewise angle $\phi_1$ or angle $\phi_2$. Furthermore the different shape of the bases of the beads 36 and 37 can be seen. The contact point between the fourth and third beads 36*b* and 55 can shift in a certain range over the oval base of the fourth beads 36*b*, so that the angles $\phi_1$ and $\phi_2$ do not have to be exactly 120°, so that the position of the third beads 55 can have a certain tolerance.

Figure 7:
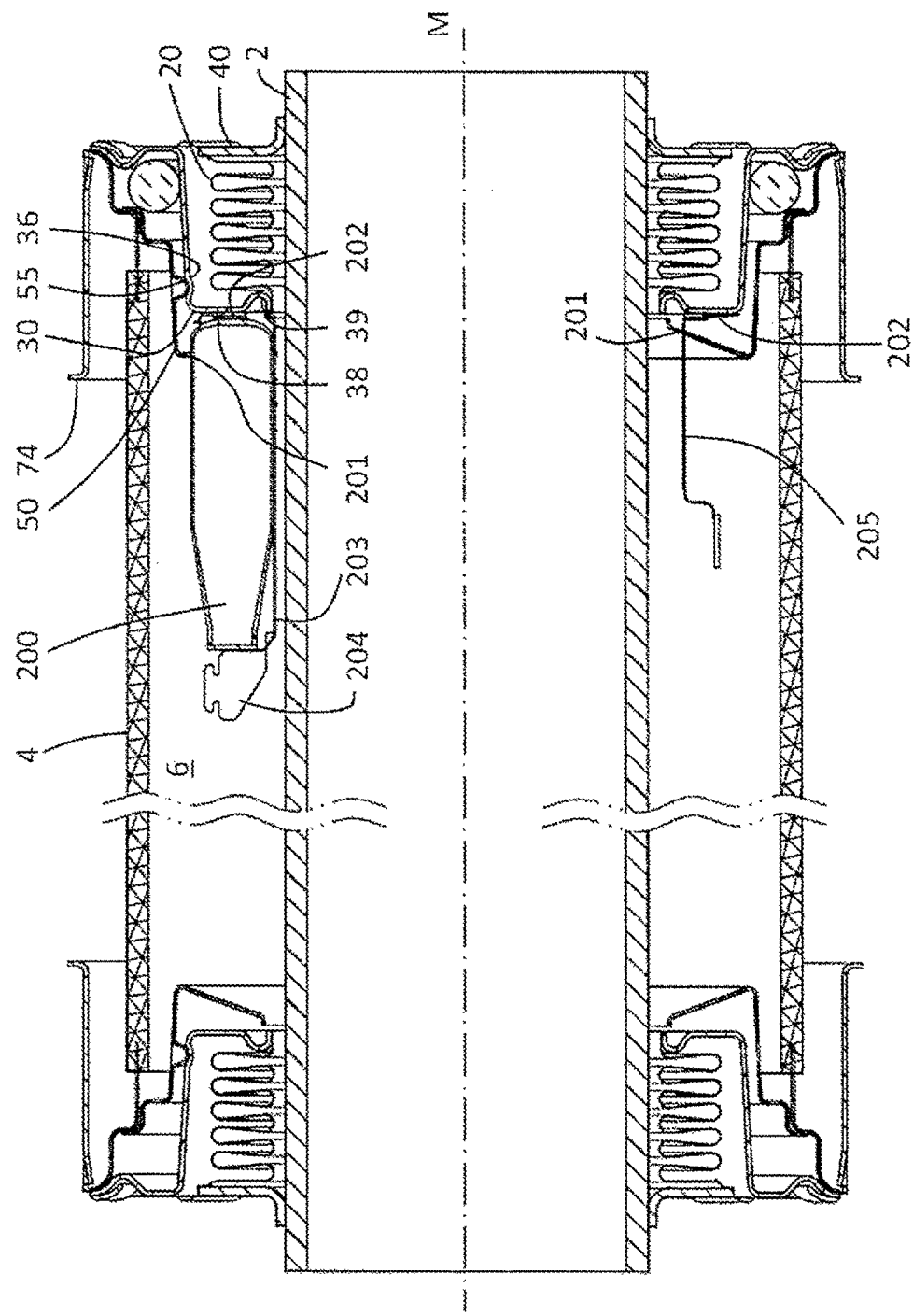
FIG. 7 shows a longitudinal section through an absorber tube with integrated protective gas container.

FIG. 7 shows an absorber tube 1 as in FIG. 1, but with an additional protective gas container 200. This protective gas container is filled with a protective gas or noble gas, preferably with xenon, and is disposed in the inner annular space 6 between the metal tube 2 and the glass sleeve tube 4. The protective gas container 200 is connected to the annular disc 38 of the attachment element 30 by means of a holder 202. For this device an opening 201, through which the protective gas container 200 protrudes into the inner annular space 6, is provided in the shielding device 50. In order to protect the protective gas container 200 against directly and indirectly reflected radiation and increased heating effect due to the metal tube 2, a shielding unit 203 is preferably disposed between the metal tube 2 and the protective gas container 200. This shielding unit 203 can be constructed as a component of the holder 202. The shielding unit 203 is preferably a metal sheet which reflects in the direction of the metal tube 2. Preferably a valve device 204 is mounted on the protective gas container 200, and is configured for a gas exchange between the container 200 and the inner annular space 6. In addition to the protective gas container 200 an indicator getter spring 205 is shown. This is likewise mounted on the holder 202 and projects via an opening 201 in the shielding device 50 into the inner annular space 6.

In FIG. 7 for greater clarity of the representation only one protective gas container 200 and an indicator getter spring 205 are shown. It is also possible to dispose a plurality of these protective gas containers 200 or indicator getter springs 205 inside the inner annular space 6. These protective gas containers 200 and indicator getter springs 205 can also be provided on both ends 1a and 1b. Moreover, it is possible to provide only protective gas containers 200 or only indicator getter springs 205 or both in combination.

An indicator getter spring 205 is a strip of spring sheet metal which serves as a retaining element for an indicator getter.

An indicator getter allows an assessment of whether before the first operation of the absorber tube the necessary vacuum exists in the annular space between the metal tube and the glass sleeve tube or in the most unfavourable case air has already penetrated into the annular space.

As a rule the indicator getter material, which generally consists substantially of barium, is accommodated in a small ring made of steel. This ring is retained by means of the indicator getter spring on the holder 202 in the annular space 6. After the annular space 6 is evacuated, the ring is heated, so that the indicator getter material evaporates and is deposited on the glass sleeve tube. Changes in the appearance of the deposit give the person skilled in the art clues to the quality of the vacuum in the annular space.

LIST OF REFERENCE SIGNS

| | |
|---|---|
| 1 | absorber tube |
| 1a, 1b | ends of the absorber tube |
| 2 | metal tube |
| 4 | glass sleeve tube |
| 6 | inner annular space |
| 7, 7a, 7c | inner annular space section |
| 7b | annular chamber |
| 8 | annular space section |
| 9 | getter |
| 10 | glass-metal transition element |
| 12 | annular step |
| 15 | outwardly open annular space |
| 20 | expansion compensating device |
| 22 | inner end |
| 24 | outer end |
| 26 | connecting section |
| 30 | attachment element |
| 32 | annular disc section |
| 33 | fastening section extending radially outwards |
| 34 | tubular section |
| 36 | fourth bead |
| 36a, b | embodiments of the fourth bead |
| 37 | second bead |
| 38 | annular disc |
| 38a | inner edge |
| 39 | fastening section/first bead |
| 40 | fastening element |
| 50 | shielding device |
| 51 | inner edge of the shielding device |
| 51a | angled section |
| 52 | first annular disc-shaped section |
| 53 | radially outer edge |
| 54 | first tubular section |
| 55 | third bead |
| 56 | second annular disc-shaped section |
| 57 | third annular disc-shaped section |
| 58 | second tubular section |
| 60 | opening |
| 70 | outer protective cap |
| 74 | flange |
| 100 | connection region of attachment element and expansion compensating device |
| 110 | end face |
| 200 | protective gas container |
| 201 | opening in the shielding device |
| 202 | holder |
| 203 | shielding unit |
| 204 | valve device |
| 205 | indicator getter spring |
| S | perpendicular |
| α | angle of inclination of the first annular disc-shaped section |
| R1 | inner radius of the annular section of the shielding device |
| R2 | inner radius the expansion compensating device |

LIST OF REFERENCE SIGNS

| | |
|---|---|
| R3 | inner radius of the annular disc of the attachment element |
| M | central axis of the metal tube |
| Φ1 | angle 1 between fourth bead 36a and fourth bead 36b |
| Φ2 | angle 2 between two fourth beads 36b |
| B | width of the end face |
| S1, S2, S3 | radiation paths of incident and reflected light |

What is claimed is:

1. An absorber tube comprising:
a central metal tube;
a glass sleeve tube surrounding the central metal tube;
a glass-metal transition element disposed on an end of the glass sleeve tube, wherein the central metal tube and the glass-metal transition element are movable relative to one another in a longitudinal direction and connected to one another by an expansion compensating device, the expansion compensating device being disposed at least partially in an annular space between the central metal tube and the glass-metal transition element, the annular space having an annular space section constructed between the glass-metal transition element and the attachment element, wherein the expansion compensating device having an inner end and an outer end, the inner end being fastened to an attachment element, the attachment element being connected to the glass-metal transition element, the outer end being fastened to the central metal tube, wherein, in axial plan view, the attachment element and the expansion compensating device have a circular ring-shaped end face, wherein the attachment element has an annular disc on which the expansion compensating device is fastened; and
a shielding device separate from the attachment element, the shielding device having a first annular disc-shaped section, the shielding device being disposed in the annular space, wherein, in the axial direction, the annular disc-shaped section is disposed with a spacing before the end face.

2. The absorber tube according to claim 1, wherein the annular disc has an inner edge with an inner radius (R3) on which the expansion compensating device is fastened.

3. The absorber tube according to claim 2, wherein the first annular disc-shaped section has an inner radius (R1) that is greater than or equal to the inner radius (R3).

4. The absorber tube according to claim 2, wherein the expansion compensating device has an inner radius (R2) that is greater than or equal to the inner radius (R3).

5. The absorber tube according to claim 1, wherein the annular disc has a first bead on which the expansion compensating device is disposed.

6. The absorber tube according to claim 1, wherein the first annular disc-shaped section is inclined by an angle with respect to a perpendicular on of a central axis, the angle being greater than or equal to 0.

7. The absorber tube according to claim 6, wherein the first annular disc-shaped section is inclined in such a way that a radially outer edge protrudes axially further into the annular space than an inner edge of the first annular disc-shaped section.

8. The absorber tube according to claim 1, wherein the shielding device extends at least partially into the annular space section.

9. The absorber tube according to claim 1, wherein the first annular disc-shaped section has a radially outer edge that merges into a first tubular section, which extends into the annular space section.

10. The absorber tube according to claim 9, wherein the first tubular section is of cylindrical or conical construction.

11. The absorber tube according to claim 9, wherein the first tubular section is disposed spaced apart from the attachment element.

12. The absorber tube according to claim 9, wherein the first tubular section contacts the attachment element.

13. The absorber tube according to claim 12, wherein the first tubular section and the attachment element each have at least one fourth bead and a third bead that engage in one another.

14. The absorber tube according to claim 1, wherein the shielding device has a second annular disc-shaped section that bears against the glass-metal transition element or the attachment element.

15. The absorber tube according to claim 1, wherein the shielding device has a third annular disc-shaped section and the glass-metal transition element has an annular step on which the third annular disc-shaped section is supported.

16. The absorber tube according to claim 15, wherein the second annular disc-shaped section separates the annular space section and an annular space is disposed between the second annular disc-shaped section and an annular disc section of the attachment element.

17. The absorber tube according to claim 16, further comprising a getter disposed in the annular space section.

18. The absorber tube according to claim 1, further comprising, on an outside of the sleeve tube, an outer protective cap that covers the glass-metal transition element.

19. An absorber tube comprising:
a central metal tube;
a glass sleeve tube surrounding the central metal tube;
a glass-metal transition element disposed on an end of the glass sleeve tube, wherein the central metal tube and the glass-metal transition element are movable relative to one another in a longitudinal direction and connected to one another by an expansion compensating device, the expansion compensating device being disposed at least partially in an annular space between the central metal tube and the glass-metal transition element, the annular space having an annular space section constructed between the glass-metal transition element and the attachment element, wherein the expansion compensating device having an inner end and an outer end, the inner end being fastened to an attachment element, the attachment element being connected to the glass-metal transition element, the outer end being fastened to the central metal tube, wherein, in axial plan view, the attachment element and the expansion compensating device have a circular ring-shaped end face, wherein the attachment element has an annular disc on which the expansion compensating device is fastened;
a shielding device having a first annular disc-shaped section, the shielding device being disposed in the annular space, wherein, in the axial direction, the annular disc-shaped section is disposed with a spacing before the end face; and
a holder on which a protective gas container or an indicator getter spring is disposed, the holder being fastened on the attachment element.

20. The absorber tube according to claim 19, wherein the first annular disc-shaped section has a section or an opening for the passage of the holder and/or the holder and the protective gas container or the indicator getter spring.

* * * * *